US012495769B1

United States Patent
Stone et al.

(10) Patent No.: US 12,495,769 B1
(45) Date of Patent: Dec. 16, 2025

(54) PET TOY WITH STOWABLE/EXTENDABLE TAIL

(71) Applicant: Guru Pet Company, Inc., Mount Pleasant, SC (US)

(72) Inventors: John Stone, Mount Pleasant, SC (US); Amy Stone, Mount Pleasant, SC (US)

(73) Assignee: Guru Pet Company, Inc., Mount Pleasant, SC (US)

( * ) Notice: Subject to any disclaimer, the term of this patent is extended or adjusted under 35 U.S.C. 154(b) by 0 days.

(21) Appl. No.: 18/793,254

(22) Filed: Aug. 2, 2024

Related U.S. Application Data

(60) Provisional application No. 63/532,111, filed on Aug. 11, 2023.

(51) Int. Cl.
*A01K 15/02* (2006.01)

(52) U.S. Cl.
CPC ................. *A01K 15/025* (2013.01)

(58) Field of Classification Search
CPC ........... A01K 15/025; A63H 3/28; A63H 5/00
USPC .......................... 473/578; 446/184, 188, 490
See application file for complete search history.

(56) References Cited

U.S. PATENT DOCUMENTS

| | | | |
|---|---|---|---|
| 4,614,505 A | 9/1986 | Schneider et al. | |
| 4,696,472 A * | 9/1987 | Meyer ..................... | A63B 43/02 473/575 |
| 5,112,062 A * | 5/1992 | Pratt ....................... | F42B 6/003 473/585 |
| 5,265,559 A * | 11/1993 | Borell ................... | A01K 15/025 473/576 |
| 5,391,106 A | 2/1995 | Lidert | |
| 5,398,928 A * | 3/1995 | Rudell .................... | A63B 43/00 473/573 |
| 7,169,008 B2 | 1/2007 | Ritchey | |
| 8,464,664 B1 * | 6/2013 | Scheffler .............. | A01K 15/025 119/707 |
| 9,119,377 B2 * | 9/2015 | Gratza ................. | A01K 15/026 |
| 9,345,234 B2 * | 5/2016 | Curry ................... | A01K 15/025 |
| 2016/0029597 A1 | 2/2016 | Gratza | |
| 2017/0094944 A1 | 4/2017 | Knight et al. | |
| 2020/0390065 A1 | 12/2020 | Seadler et al. | |
| 2022/0104458 A1 * | 4/2022 | Salyer .................. | A01K 15/025 |
| 2023/0397575 A1 * | 12/2023 | Lopez .................. | A01K 15/025 |

* cited by examiner

*Primary Examiner* — Kimberly S Berona
*Assistant Examiner* — Katherine June Walter
(74) *Attorney, Agent, or Firm* — Standley Law Group LLP; James L. Kwak; Adam J. Smith

(57) ABSTRACT

A pet toy with a stowable tail includes a body defining an interior space. The body includes an opening. A barrier extends within the interior space. A tail is attached to the barrier and is extendable through the opening in the body. The barrier may partition the interior space and may include an anchor to which an attachment portion of the tail is attached. An elongate portion of the tail extending from the attachment portion may be sufficiently flexible to permit stuffing of an entirety of the tail within a portion of the interior space.

16 Claims, 6 Drawing Sheets

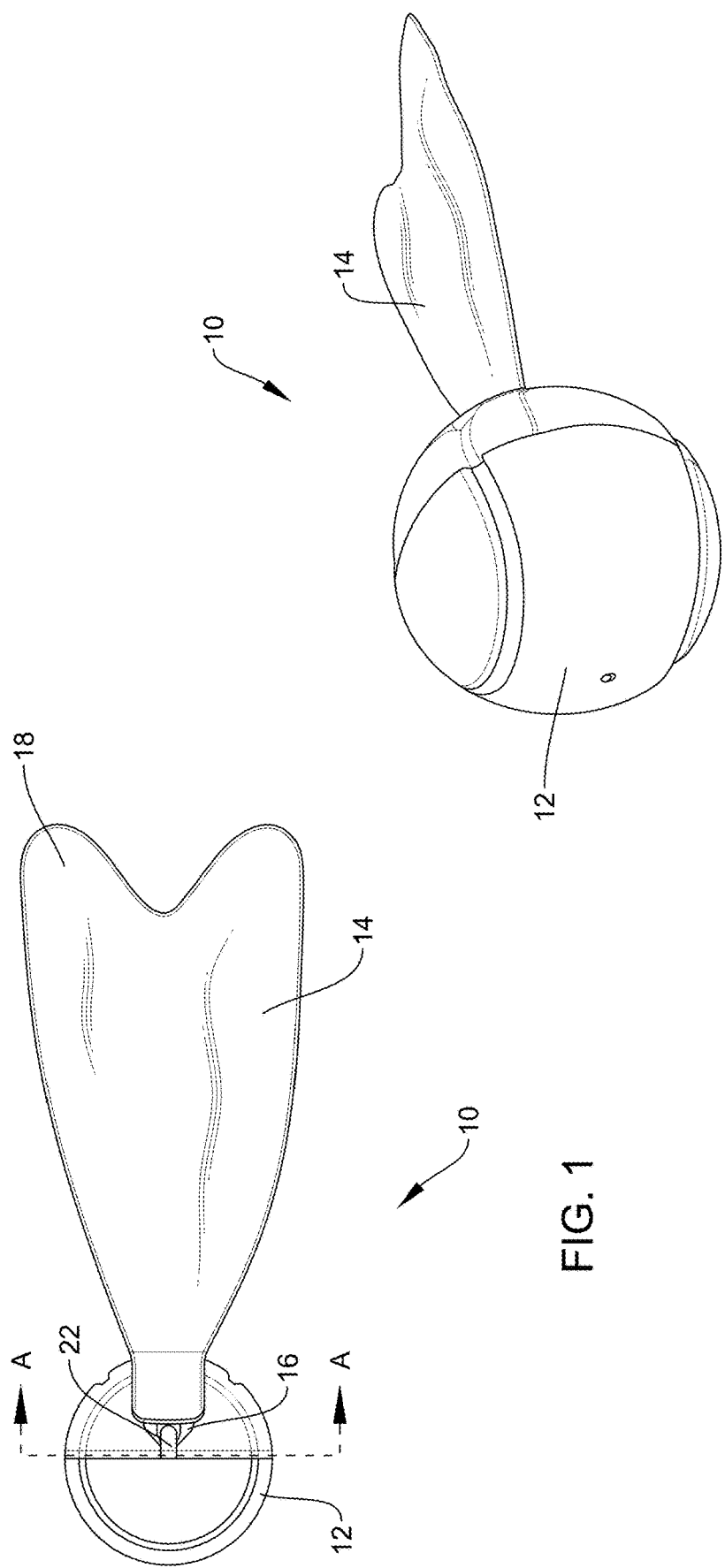

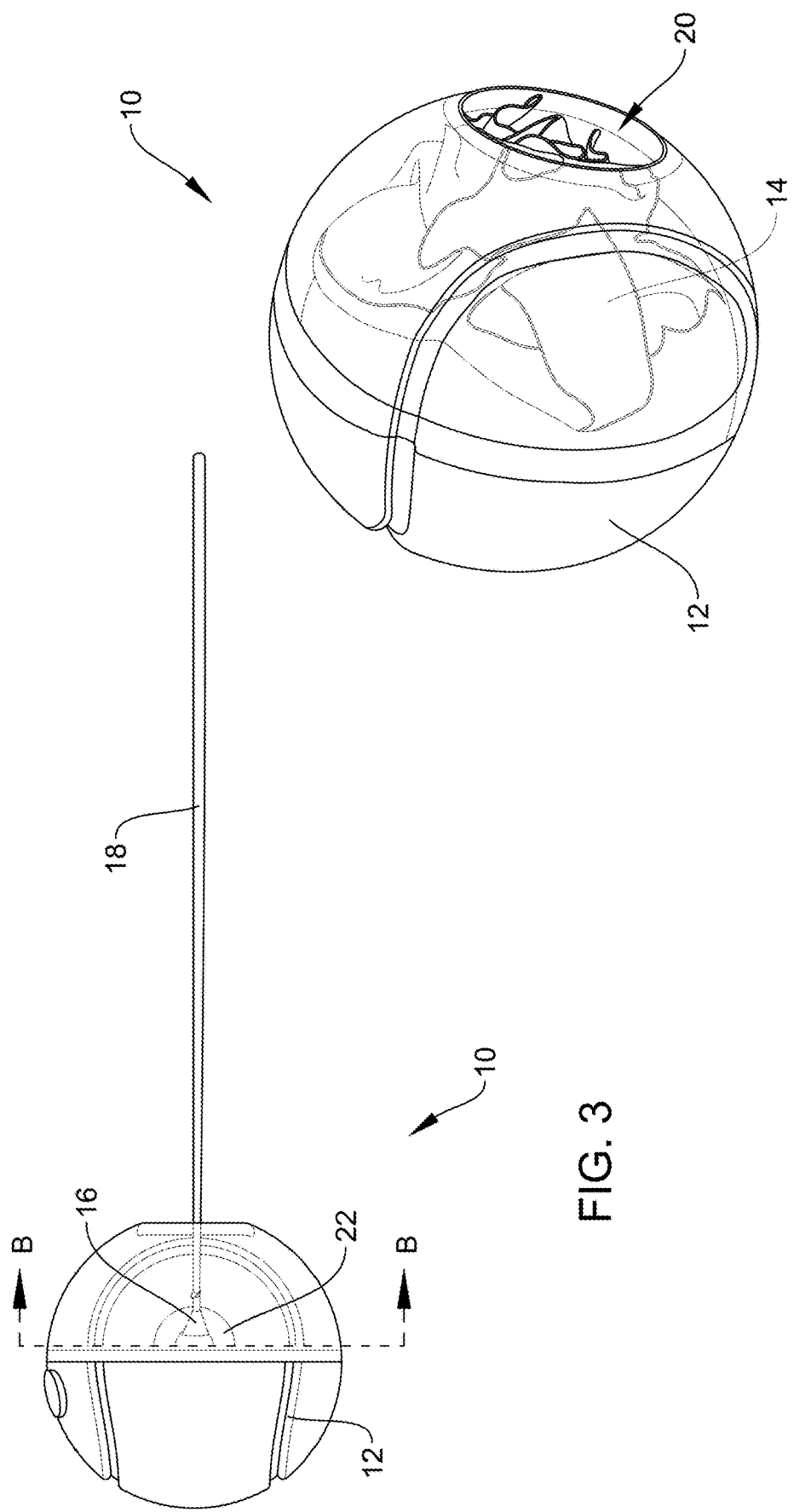

PET TOY WITH STOWABLE/EXTENDABLE TAIL

CROSS-REFERENCE TO RELATED APPLICATIONS

This application claims the benefit of U.S. provisional application Ser. No. 63/532,111 filed Aug. 11, 2023, the disclosures of which are hereby incorporated by reference as if fully restated herein.

TECHNICAL FIELD

Exemplary embodiments relate generally to pet toys with stowable/extendable tails.

BACKGROUND AND SUMMARY OF THE INVENTION

Pets and other animals need stimulation to stay healthy. A variety of pet toys are known which provide stimulation. Pets are known to enjoy chasing objects and uncovering hidden objects. It can be difficult for humans to provide such playtime activities for pets and other animals. Therefore, what is needed are pet toys which provide simulation for pets and other animals which are easily operated by a human.

A pet toy with stowable tail is provided. The tail may be extended from an attachment point within a housing, which may be provided in the form of a ball, rocket, or other shape. The housing may be easily graspable by one or both of human and animal. The tail, when extended, may provide stability of flight. The tail may also provide another grasping point for the human or pet and/or catch the pet's attention. The tail may be storable within a portion of the housing. This may provide compact storage of the toy and/or stimulation for the pet by allowing the pet to work to pull the tail out. The toy may include a noise making device, such as a squeaker, in another portion of the housing. The tail attachment/storage portion may be separated from the noisemaker portion by an internal barrier, which may partition the interior space. A loop attachment point may be provided at the barrier to which the tail is attachable. Food may optionally be stored within the housing, such as in the stuff area for the tail. This may provide additional stimulation for the pet.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1 is a top view of an exemplary pet toy with an extended tail;

FIG. 2 is front perspective view of the pet toy of FIG. 1;

FIG. 3 is side perspective view of the pet toy of FIG. 1;

FIG. 4 is rear perspective view of the pet toy of FIG. 1 with the tail stowed;

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 7:
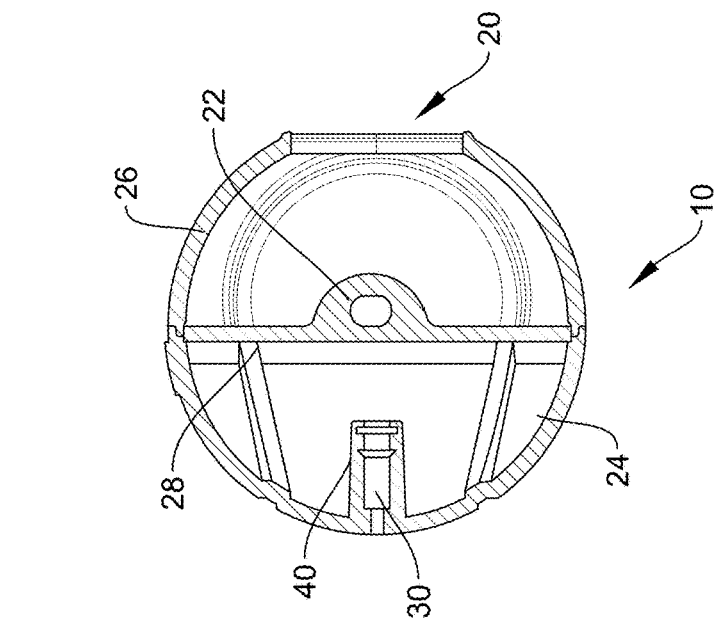
FIG. 7 is side sectional view of the pet toy of FIG. 5 taken along section line B-B of FIG. 3.
Figure 6:
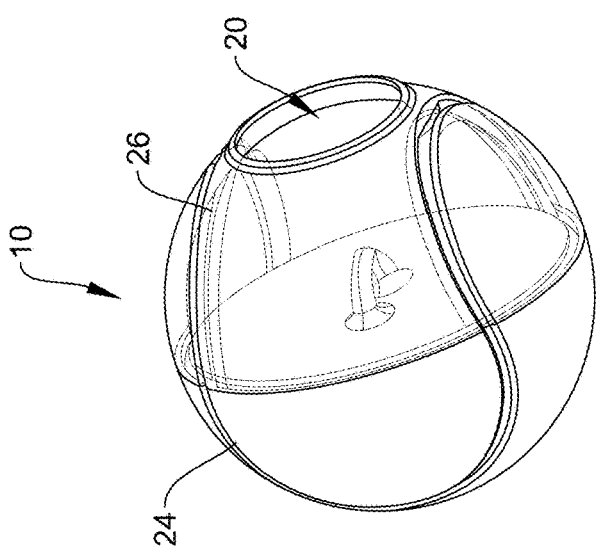
FIG. 6 is front, perspective, partially translucent view of the pet toy of FIG. 5.
Figure 5:
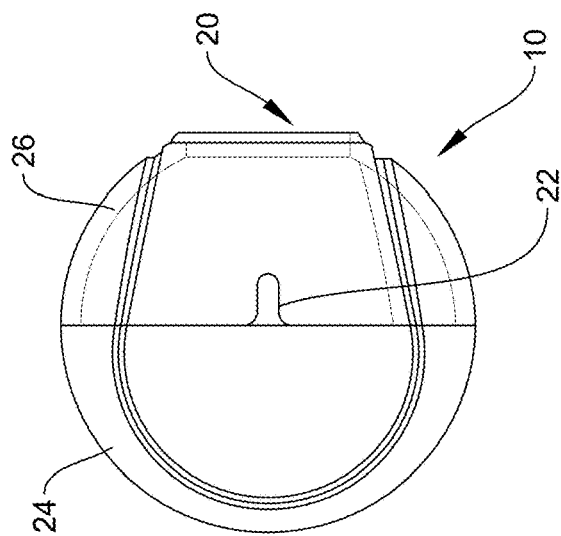
FIG. 5 is side, partially sectioned view of the pet toy of FIG. 1 taken along section line A-A of FIG. 1 with the tail removed.
Figure 8:
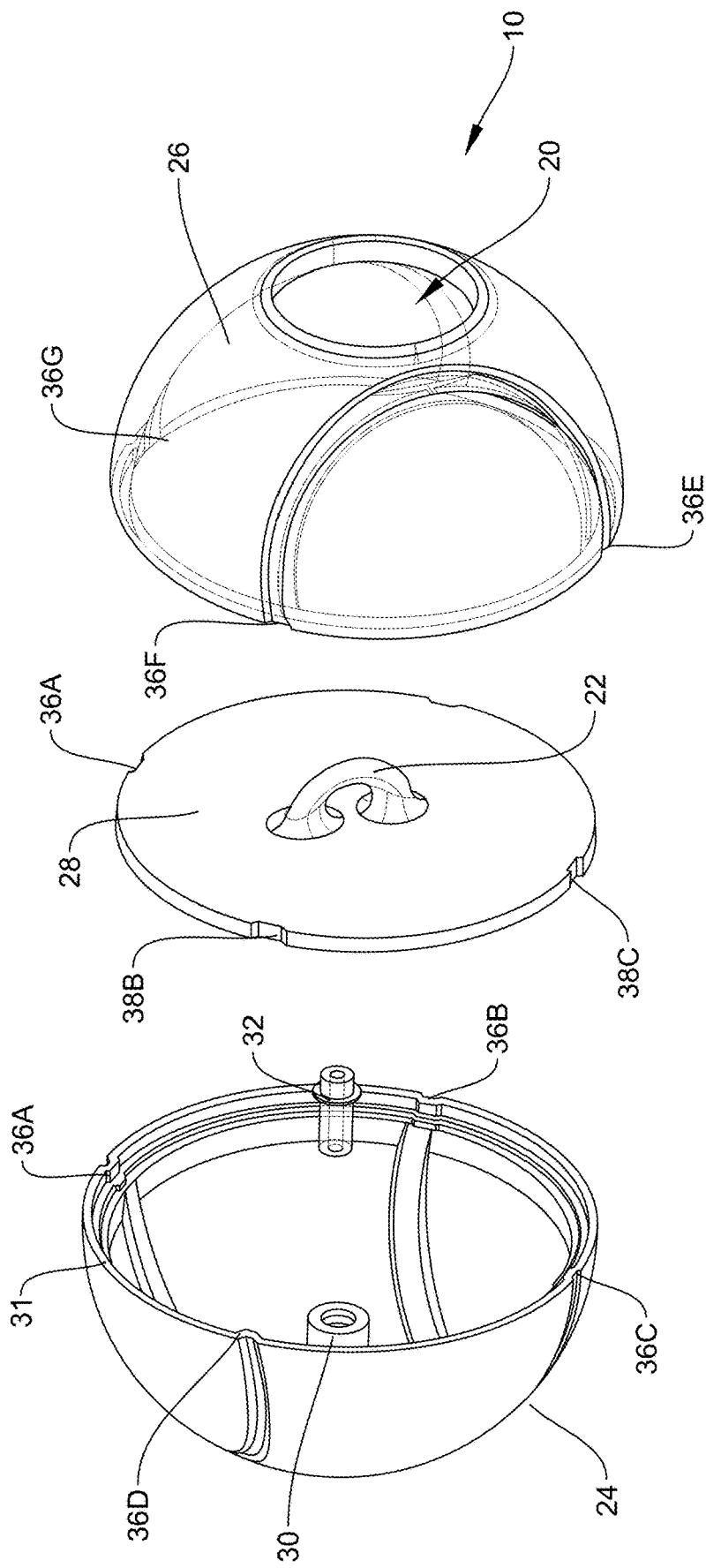
FIG. 8 is an exploded view of the pet toy of FIG. 5.

FIG. 1 through FIG. 8 illustrate an exemplary toy 10 for pets or other animals with a stowable/extendable tail 14. The toy 10 may comprise a housing 12. The housing 12 may comprise a first portion 24 and a second portion 26. In exemplary embodiments, without limitation, the two portions 24, 26 are formed as separate parts which joined along a seam 34. Joining may be performed by thermal bonding, welding (e.g., ultrasonic welding), adhesive, combinations thereof, or the like.

The toy 10 may comprise a barrier 28 which extends within an interior space defined by said housing 12. The barrier 28 may be interposed between the portions 24, 26. The barrier 28 may partition the interior space, and may optionally extend along the seam 34.

The housing 12 may take on various shapes, such as but not limited to a sphere. The portions 24, 26 are preferably half spheres with the barrier 28 being generally circular in shape and preferably dividing the sphere in substantially (e.g., within 10% of) equal halves, by way of non-limiting example.

Mating tabs and recesses 36, 38, respectively, may be provided along the portions 24, 26 and/or the barrier 28, such as for alignment and joining. In exemplary embodiments, without limitation, a number of such tabs 36A-36G may be spaced apart along a perimeter of each of the portions 24, 26 with a number of such recesses 38 spaced apart along a perimeter the barrier 28. Other mating components may be utilized, such as grooves, slots, protrusions, recesses, combinations thereof, or the like. The seam 31 may comprise a groove at one or both portions 24, 26 to secure the barrier 28 within the housing 12, though such is not required as the shape of the housing 12 and/or the tabs 36 and recesses 38 may alternatively or additionally secure the position of the barrier 28.

The housing 12 may generally take on the shape, look, and feel of a tennis ball, though such is not required. The first portion 24 may comprise an opaque material. The second portion 26 may comprise a partially or fully transparent material, though such is not required. Some or all of one or both of the first and second portions 24, 26 may comprise a textured surface or material along outer portions thereof.

The barrier 28 may comprise an anchor portion 22. The anchor portion 22 may comprise a loop, arch, hook, or the like. The anchor portion 22 is preferably provided at a central location of a rear facing surface of the barrier 28, though other locations may be utilized.

The tail 14 may comprise an attachment portion 16 at a first end thereof which is configured for attachment to the anchor portion 22 provided at the barrier 28. The tail 14 may comprise an elongate, flexible portion 18 extending therefrom such that a second end of the trail 14 is free/unattached. The elongate portion 18 of the tail 14 may be extendable through an aperture 20 in the second portion 26 of the housing 12, such as to extend rearward of the housing 12 (e.g., FIGS. 1-3). The elongate portion 18 may comprise one or more fabrics. The flexible nature of the elongate portion 18 may permit stuffing the tail 14 through the aperture 20 for partial or whole storage within an internal space of the housing 12, such as defined by, at least in part, the second portion 26 and the barrier 28 (e.g., FIG. 4). Various size, shape, and/or styles of the tail 14 may be utilized.

The attachment portion 16 may comprise a relatively rigid material, such as one or more polymers. The attachment portion 16 may comprise deformable arms, carabiners, clips, combinations thereof, or the like by way of non-limiting example. In other exemplary embodiments, without limitation, the attachment portion 16 may comprise a same material as the elongate portion 18 of the tail 14 which is tied about the anchor portion 22. The attachment portion 16 may be temporarily securable to, or permanently securable to, the anchor portion 22.

The first portion 24 of the housing 12 may include a noise maker. The noise maker may comprise a squeaker in exemplary embodiments. The noise maker may include a base 30 which is attached to a protrusion 40 extending from the first portion 24 inward and a reed 32 insertable into the base 30. The housing 12 may be generally compressible, such as to force air through the reed 32, which may vibrate to make noise. The protrusion 40 may comprise one or more slots configured to receive mating protrusions the base 30, by way of non-limiting example. The base 30 may likewise comprise slots which are configured to mate with protrusions in the reed 32.

In exemplary embodiments, without limitation, some or all components of the toy 10, such as the housing 12, such as more specifically the first and second portions 24, 26 and the barrier 28, may be formed by injection molding. Once assembled, the housing 12 may be secured by heat welding, adhesive, combinations thereof, or the like, along the seam 30 in exemplary embodiments, without limitation. The tail 14 may be inserted through the aperture 20 and tied or otherwise attached to the anchor portion 22. Some or all of the components may comprise one or more polymers, silicone, rubber (e.g., thermoplastic rubber) combinations thereof, or the like, by way of non-limiting example.

In exemplary embodiments, without limitation, the housing 12 may be approximately 88.9 mm in diameter, 86 mm in length, with a wall thickness of approximately 4.5 mm, and the opening 20 may be 35 mm in diameter, by way of non-limiting example. As used herein, approximate may include within (+/−) 20% of the stated dimensional value.

Figure 10:
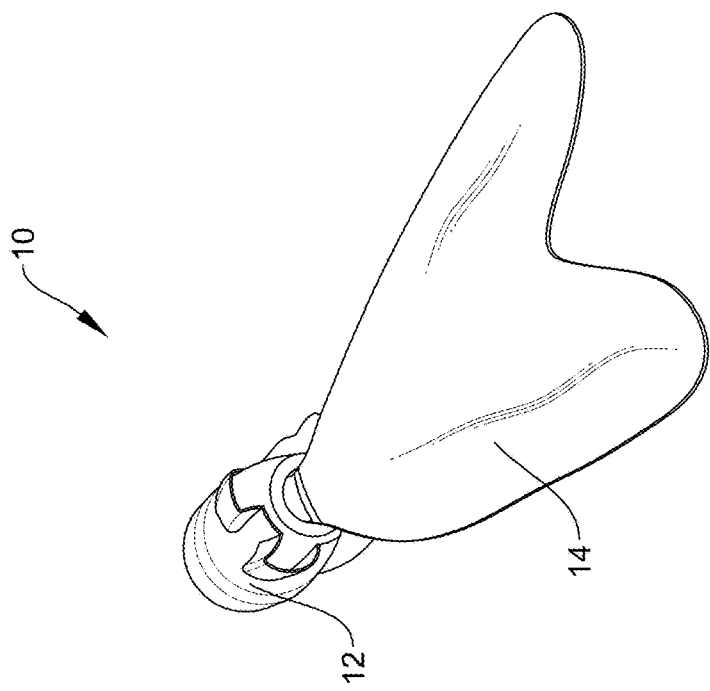
FIG. 10 is a rear perspective view of the pet toy of FIG. 9.
Figure 9:
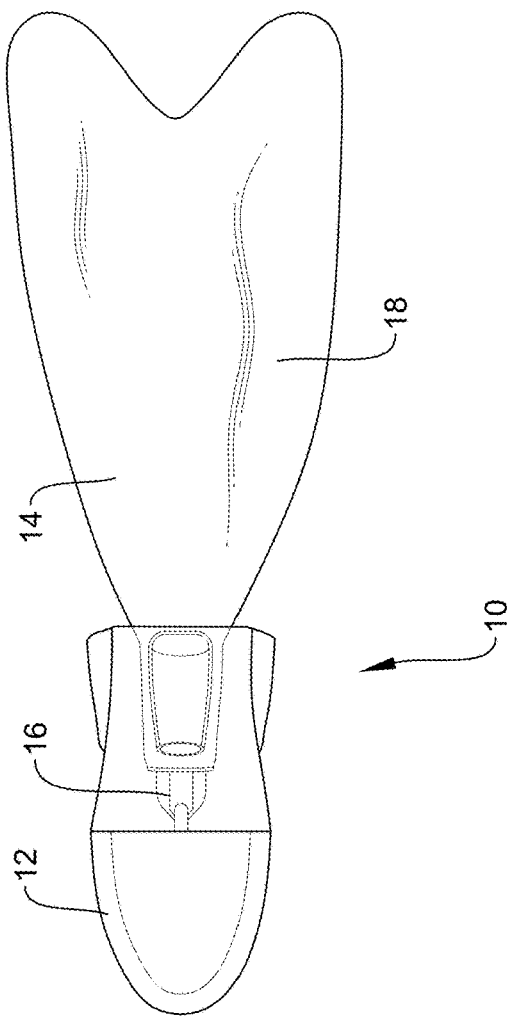
FIG. 9 is a top view of another exemplary embodiment of the pet toy of FIG. 1 with the tail extended.
Figure 12:
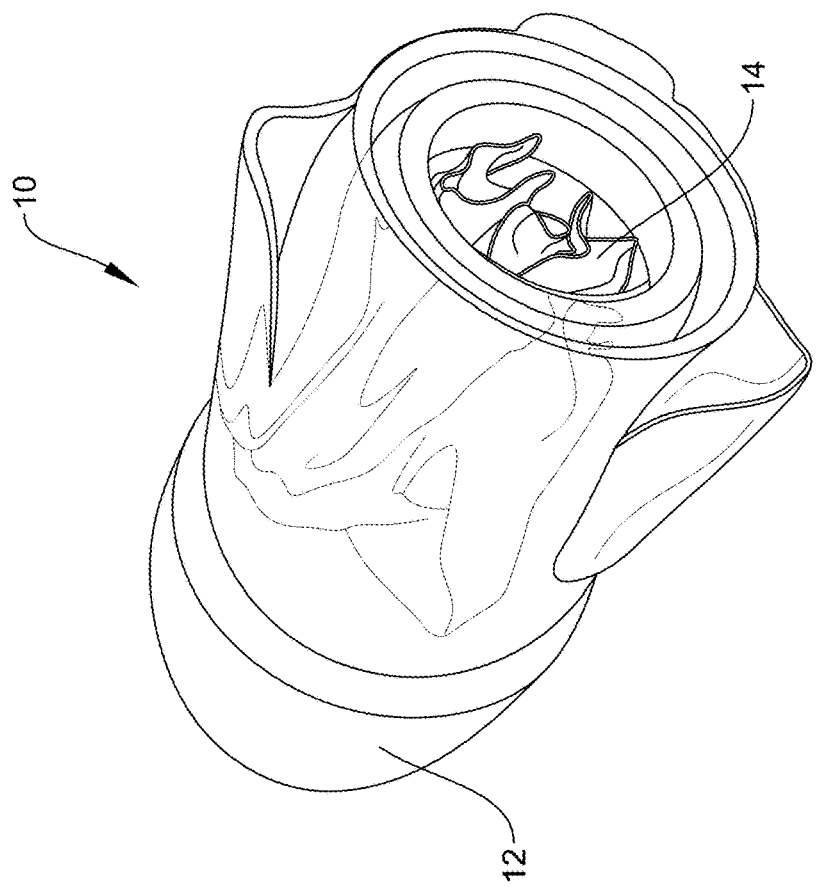
FIG. 12 is a rear perspective view of the pet toy of FIG. 9 with the tail stowed.
Figure 11:
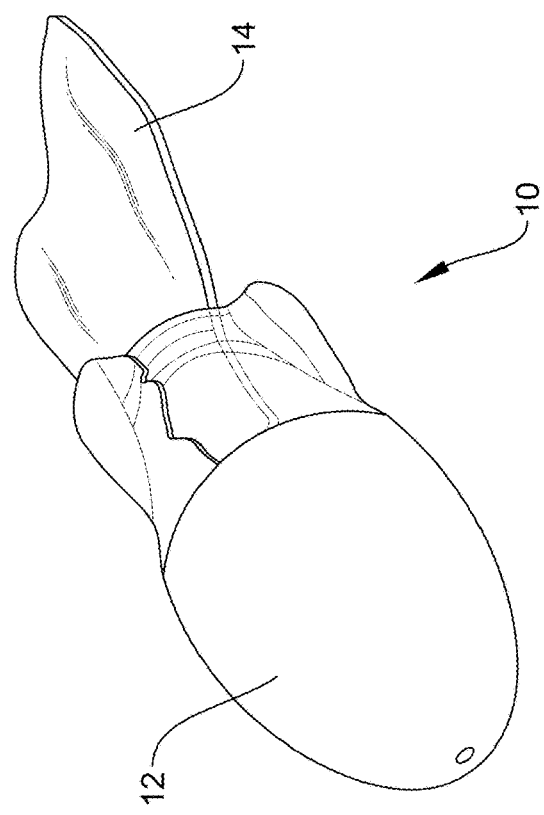
FIG. 11 is a front perspective view of the pet toy of FIG. 9.

As illustrated with particular regard to at least FIG. 9 through FIG. 12, the housing 12 may be provided in various shapes and forms. By way of additional, non-limiting example, the housing 12 may be provided in a generally rocket-ship shape. Similarly, the tail 14 may be provided in various sizes and shapes.

Treats or other food may be stuffed into the second portion 26, such as by way of the aperture 20. The treats or other food may be added with the tail 14, for example, such as to create a puzzle for the pet or other animal to solve and be rewarded by treats or other food. For example, pulling out the tail 14 may cause some or all of the stuffed food to be dislodged and/or permit access through the opening 20 to dislodge the food.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

What is claimed is:

1. A pet toy with a stowable/extendable tail, said pet toy comprising:
    a body defining, at least in part, an interior space and an opening into said interior space;
    a barrier located within the interior space and partitioning the interior space into a first portion rearward of the barrier and a second portion forward of the barrier, and comprising an anchor portion at rearward facing surface of the barrier and thereby within the first portion of the interior space; and
    a tail, configured to be stuffed within the first portion of the interior space, and having a first end attached to said anchor portion of said barrier and a second, free end which is extendable through the opening;
    wherein said body includes a first portion corresponding to the first portion of the interior space and comprising a first material, and a second portion corresponding to the second portion of the interior space and comprising a second material.

2. The pet toy of claim 1 wherein:
    said anchor portion comprises an arch defining a space between a lower surface of the arch and the rearward facing surface of the barrier; and
    said tail comprises an attachment portion at the first end thereof, wherein said attachment portion extends through the space defined by the anchor portion, and an elongate portion extending from the attachment portion to the second, free end.

3. The pet toy of claim 2, wherein:
    said elongate portion comprises a fabric material.

4. The pet toy of claim 1 wherein:
the body is spherical in shape; and
the barrier is circular in shape and divides the interior space into substantially equal halves.

5. The pet toy of claim 1 wherein:
the second portion of the body extending forward of the barrier is compressible.

6. The pet toy of claim 5 further comprising:
a reed device located within the second portion of the body which is configured to make noise when the second portion of the body is compressed.

7. The pet toy of claim 6 wherein:
a first portion of the body extending rearward of the barrier is relatively rigid compared to the second portion of the body.

8. The pet toy of claim 7 wherein:
the first material comprises a thermoplastic rubber; and
the second material comprises a polymer.

9. The pet toy of claim 1 further comprising:
tabs provided at an interior surface of the body; and
recesses provided at the barrier configured to mate with the tabs.

10. The pet toy of claim 1 wherein:
the tail has a tapered shape.

11. A method of playing with a pet toy having a stowable/extendable tail, said method comprising:
providing the pet toy of claim 1:
stuffing the tail into the first portion of the interior space of the body;
providing the pet toy to a pet with the tail stuffed into the first portion of the interior space;
extending the tail from the first portion of the interior space so that the tail extends outside of the body; and
throwing the pet toy with the tail extended.

12. The method of claim 11 further comprising:
inserting food through the opening to be stored in the first portion of the interior space with the tail.

13. The method of claim 11 further comprising:
providing the body of the pet toy as two halves; and
joining the two halves of the body along a seam.

14. The method of claim 13 wherein:
the body and the barrier comprise a thermoplastic rubber; and
the joining is performed by heat welding.

15. The pet toy of claim 1 wherein:
the first material comprises a thermoplastic rubber; and
the second material comprises a polymer.

16. A pet toy with a stowable/extendable tail, said pet toy comprising:
a body defining, at least in part, an interior space and an opening into said interior space;
tabs provided at an interior surface of the body;
a barrier located within the interior space, partitioning the interior space into a first portion rearward of the barrier and a second portion forward of the barrier, and comprising an anchor portion at rearward facing surface of the barrier and thereby within the first portion of the interior space and recesses provided at the barrier configured to mate with the tabs; and
a tail, configured to be stuffed within the first portion of the interior space, and having a first end attached to said anchor portion of said barrier and a second, free end which is extendable through the opening.

* * * * *